United States Patent
Lusher et al.

(10) Patent No.: US 7,024,464 B1
(45) Date of Patent: Apr. 4, 2006

(54) DYNAMIC CONTENT MANAGEMENT FOR WIRELESS COMMUNICATION SYSTEMS

(75) Inventors: Elaine Lusher, Pleasanton, CA (US); Wenjun Luo, Cupertino, CA (US); Scott Lincke, San Carlos, CA (US)

(73) Assignees: 3Com Corporation, Santa Clara, CA (US); Palm Inc., Santa Clara, CA (US)

( * ) Notice: Subject to any disclaimer, the term of this patent is extended or adjusted under 35 U.S.C. 154(b) by 465 days.

(21) Appl. No.: 09/607,534

(22) Filed: Jun. 29, 2000

(51) Int. Cl.
*G06F 13/00* (2006.01)

(52) U.S. Cl. .................. 709/219; 709/206; 709/246

(58) Field of Classification Search ............... 709/217, 709/219, 223, 313, 328, 329, 206, 246; 707/104; 715/313, 513; 719/328, 329
See application file for complete search history.

(56) References Cited

U.S. PATENT DOCUMENTS

| | | | |
|---|---|---|---|
| 5,918,013 A * | 6/1999 | Mighdoll et al. ............ 709/217 |
| 6,138,156 A * | 10/2000 | Fletcher et al. ............. 709/224 |
| 6,167,441 A * | 12/2000 | Himmel ...................... 709/217 |
| 6,237,053 B1 * | 5/2001 | Herrod et al. ................. 710/65 |
| 6,247,048 B1 * | 6/2001 | Greer et al. ................. 709/219 |
| 6,336,137 B1 * | 1/2002 | Lee et al. .................... 709/219 |
| 6,446,096 B1 * | 9/2002 | Holland et al. ............. 707/513 |
| 6,470,378 B1 * | 10/2002 | Tracton et al. .............. 709/203 |
| 6,477,529 B1 * | 11/2002 | Mousseau et al. ............. 707/5 |
| 6,493,758 B1 * | 12/2002 | McLain ...................... 709/227 |
| 6,697,842 B1 * | 2/2004 | Smith et al. ................ 709/206 |
| 6,760,759 B1 * | 7/2004 | Chan ........................... 709/219 |
| 6,816,881 B1 * | 11/2004 | Mohindra et al. .......... 709/203 |
| 2001/0042081 A1 * | 11/2001 | MacFarlane et al. ........ 707/513 |
| 2002/0059344 A1 * | 5/2002 | Britton et al. .............. 707/513 |

OTHER PUBLICATIONS

"How To Personalize the Web", Rob Barrett, Paul P. Maglio ad Daniel C. Kellem, IBM, San Jose, CA, Sep. 2000.

* cited by examiner

*Primary Examiner*—Viet D. Vu

(57) ABSTRACT

A method and system for dynamically managing content provided to a mobile device. In one embodiment, the present invention begins by retrieving information from a network. In one embodiment the information is web-based content, and the network is the Internet. The present method and system then dynamically assesses the information which was retrieved from the network. In particular, in one embodiment, the present invention assesses the information by determining the application to which the information corresponds. Next, the present embodiment selectively filters the information such that desired information is compiled. After the selective filtering process, the present embodiment forwards the desired information to the mobile device. In so doing, the present embodiment provides an approach which dynamically manages the content of information so as to efficiently, responsively, and inexpensively provide a mobile device user with desired information.

21 Claims, 12 Drawing Sheets

DYNAMIC CONTENT MANAGEMENT FOR WIRELESS COMMUNICATION SYSTEMS

TECHNICAL FIELD

The present invention generally pertains to the field of mobile devices. More particularly, the present invention is related to wireless network access using a mobile device.

BACKGROUND ART

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

With the advent of the wireless technology, users of portable computers and various other mobile devices (e.g. pagers and paging systems, wireless and cellular telephones, electronic address books, and the like) now have wireless access to a host of content. This content includes web-based content which can be accessed using the Internet. Based on rapid consumer acceptance of recent technological advances, it is extremely likely that the demand for such web-based content using mobile devices will sharply accelerate. Some provisions have been made in web-based content, and in the delivery of such web-based content, to accommodate mobile devices. These provisions, referred to herein as tailoring of the content, typically comprise generically parsing information which is to be transmitted using a wireless communication system to a user of a mobile device (often referred to as "web-clipping"). As an example, many examples of generic web-clipping simply delete images, icons, and other graphics present in the web content. Unfortunately, in many applications (e.g. ECommerce) certain images, icons, and other graphics (e.g. a shopping cart icon, a "buy now" button, a picture of the item being purchased, and the like) are necessary or, at the least, important in comprehending the web-based content. Thus, even when certain web-based content has been "tailored" for mobile devices using conventional methods, such tailored content may still not be suitable for mobile device users.

As an additional drawback, many suppliers of web-based content have not yet made such provisions to accommodate the users of mobile devices. That is, the content has not yet been tailored by the web content suppliers to provide access by a mobile device. As a result, such web-based content is essentially not accessible to mobile device users. For example, users of mobile devices have not typically been enabled to effectively utilize many of the existing ECommerce applications. This inability of the mobile device user to utilize existing ECommerce applications is not, however, solely due to a lack of tailoring by ECommerce content providers. Even if all such ECommerce applications and corresponding content were conventionally tailored to accommodate users of mobile devices, ECommerce applications often contain superfluous information which is difficult to ignore when using a mobile device. That is, ECommerce content often requires viewing of numerous unwanted images (e.g. advertisements, banners, company logos, and the like). In order to navigate through such unnecessarily crowded sites requires the use of nested windows and pull down tabs, and substantial data entry. Hence, small form factor mobile devices with stylus-stroked entry pads, small viewing screens, limited keypad buttons, and the like, renders the use of certain tailored and un-tailored web-based content tedious and time consuming.

As still another disadvantage, many wireless communication systems (e.g. cellular telephone companies) charge users "by-the-minute". As a result, the longer it takes mobile device users to conduct their business, (e.g. to transmit superfluous data and unwanted advertisements) the more it costs. Hence, the cost to conventionally transmit information, via a wireless communication link, to a mobile device is compounded by the physical limitations of small form factor mobile devices as well as by the lack of provisions by certain content providers to accommodate mobile device users.

Thus, a need exists for a method and system which dynamically manages the content provided to a mobile device. A further need exists for a method and system which meets the above needs and which dynamically manages the content provided to a mobile device even if the content has not previously been tailored to accommodate access by a mobile device. Still another need exists for a method and system which meets the above needs and which inexpensively, and quickly provides a mobile device user with desired information without supplying superfluous and/or unwanted information.

DISCLOSURE OF THE INVENTION

The present invention provides a method and system which dynamically manages the content provided to a mobile device. The present invention further provides a method and system which achieves the above accomplishment and which dynamically manages the content provided to a mobile device even if the content has not previously been tailored to accommodate access by a mobile device. The present invention also provides a method and system which achieves the above accomplishment and which inexpensively, and quickly provides a mobile device user with desired information without supplying superfluous and/or unwanted information.

In one embodiment, the present invention begins by retrieving information from a network. In one embodiment the information is web-based content, and the network is the Internet. The present method and system then dynamically assesses the information which was retrieved from the network. In particular, in one embodiment, the present invention assesses the information by determining the application to which the information corresponds. Next, the present embodiment selectively filters the information such that desired information is compiled. After the selective filtering process, the present embodiment forwards the desired information to the mobile device. In so doing, the present embodiment provides an approach which dynamically manages the content of information so as to efficiently, responsively, and inexpensively provide a mobile device user with desired information.

In another embodiment, the present invention includes the features of the above-listed embodiment, and further recites that prior to forwarding the desired information to the mobile device, the desired information is reformatted based upon characteristics of the mobile device.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1A:
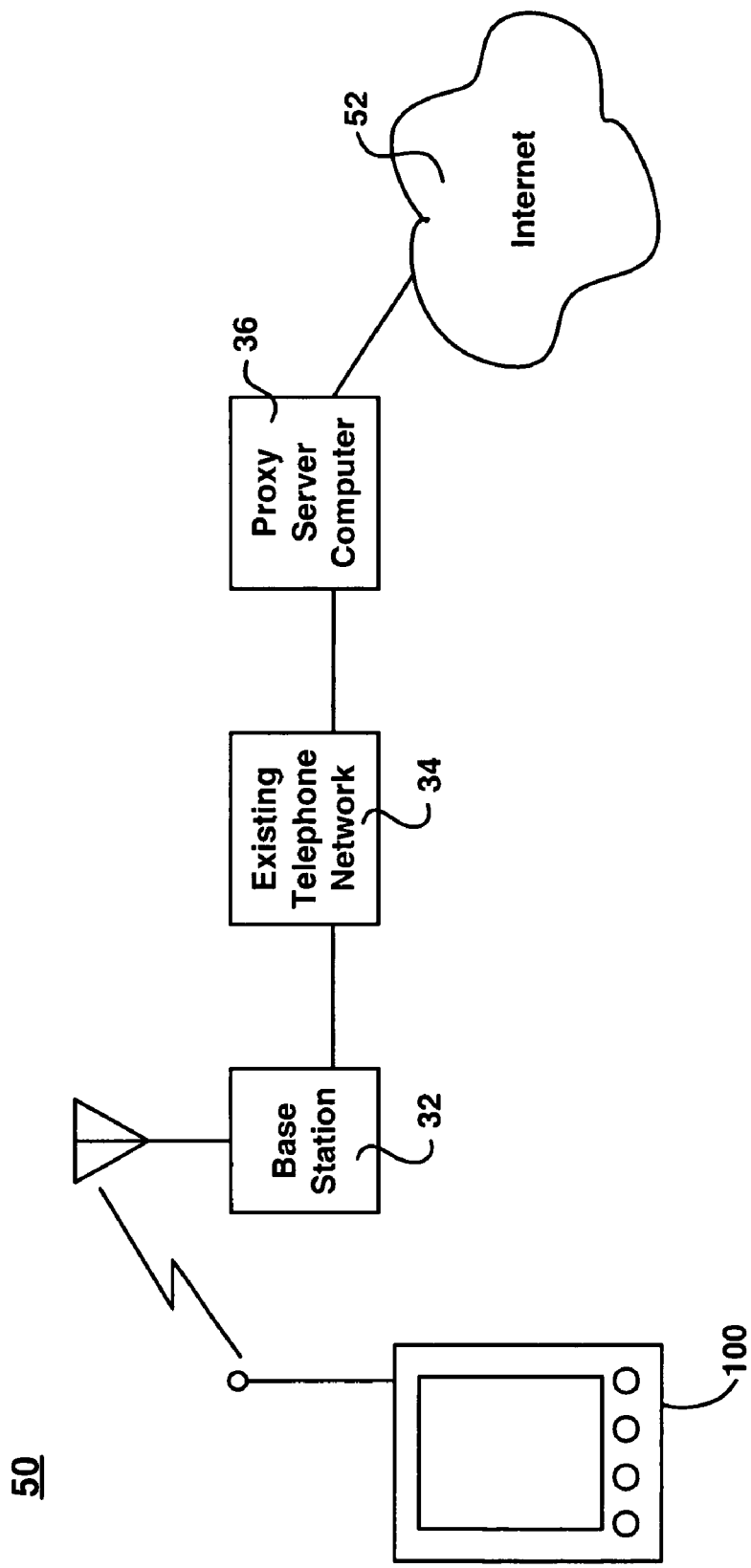
FIG. 1A is a block diagram of an exemplary network environment including a portable computer system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating" or "utilizing" or "retrieving" "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Platform

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile device which can be used to wirelessly communicate with a network. Such mobile devices include but are not limited to pagers and paging systems, wireless and cellular telephones, electronic address books, and numerous other mobile devices which have the ability to wirelessly communicate with a network. As such, for purposes of the present application, the terms "portable computer" and "mobile device" will be considered synonymous and will be used interchangeably throughout the present application.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system. The present invention is, however, well suited to use with any of the various other wireless communication systems.

Figure 1B:
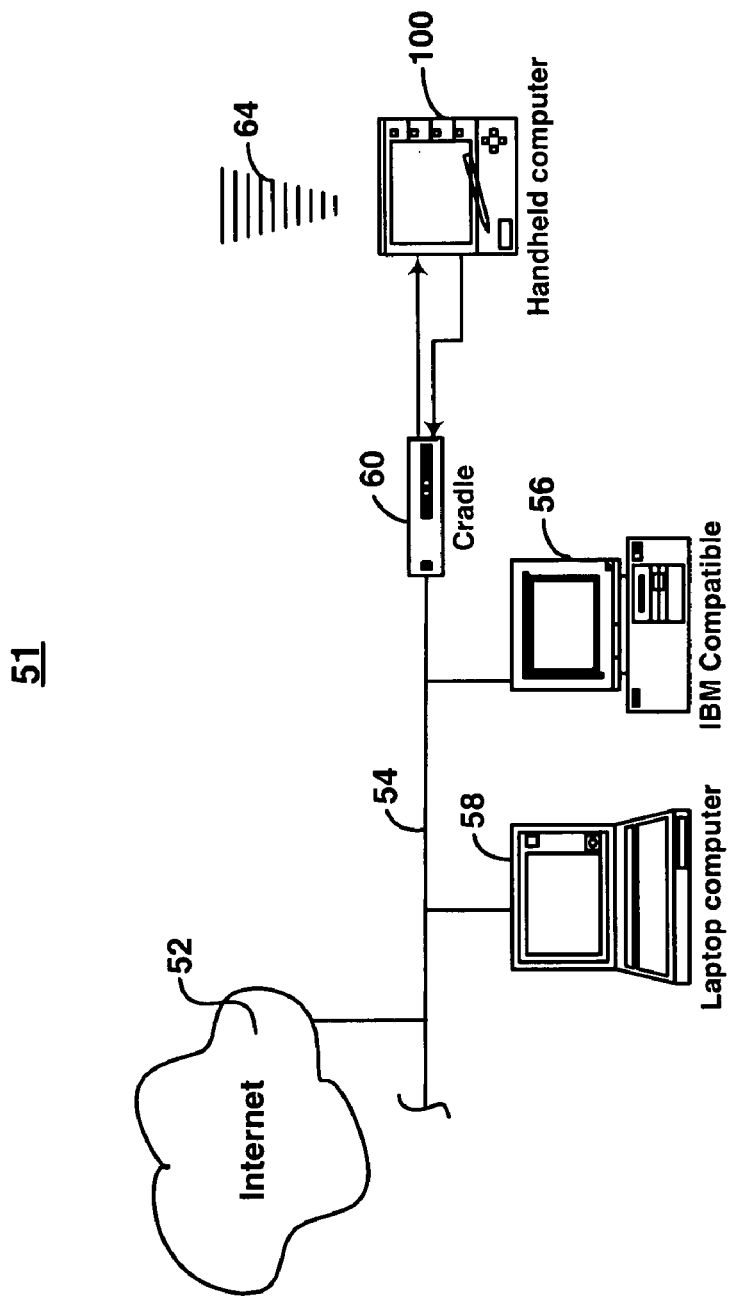
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
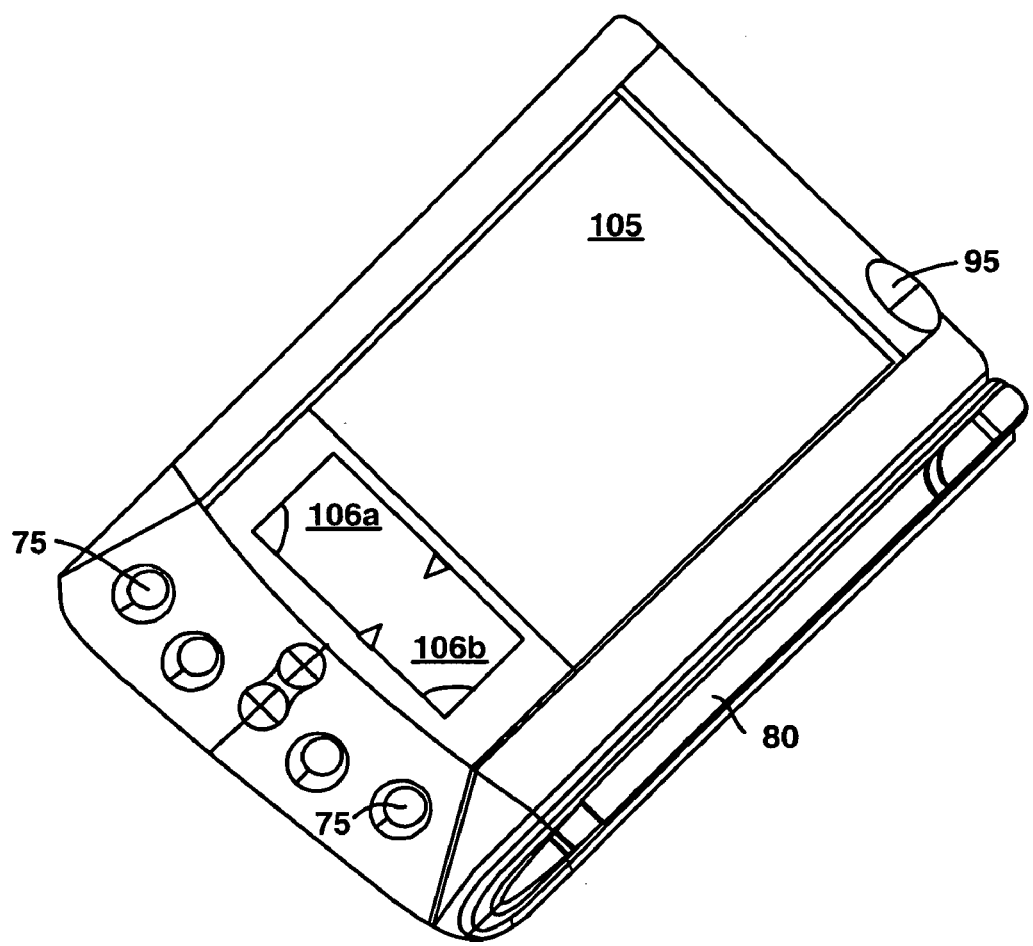
FIG. 2 is a top side perspective view of a portable computer system in accordance with one embodiment of the present invention.

FIG. 2 is a perspective illustration of the top face 100a of one embodiment of the palmtop computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
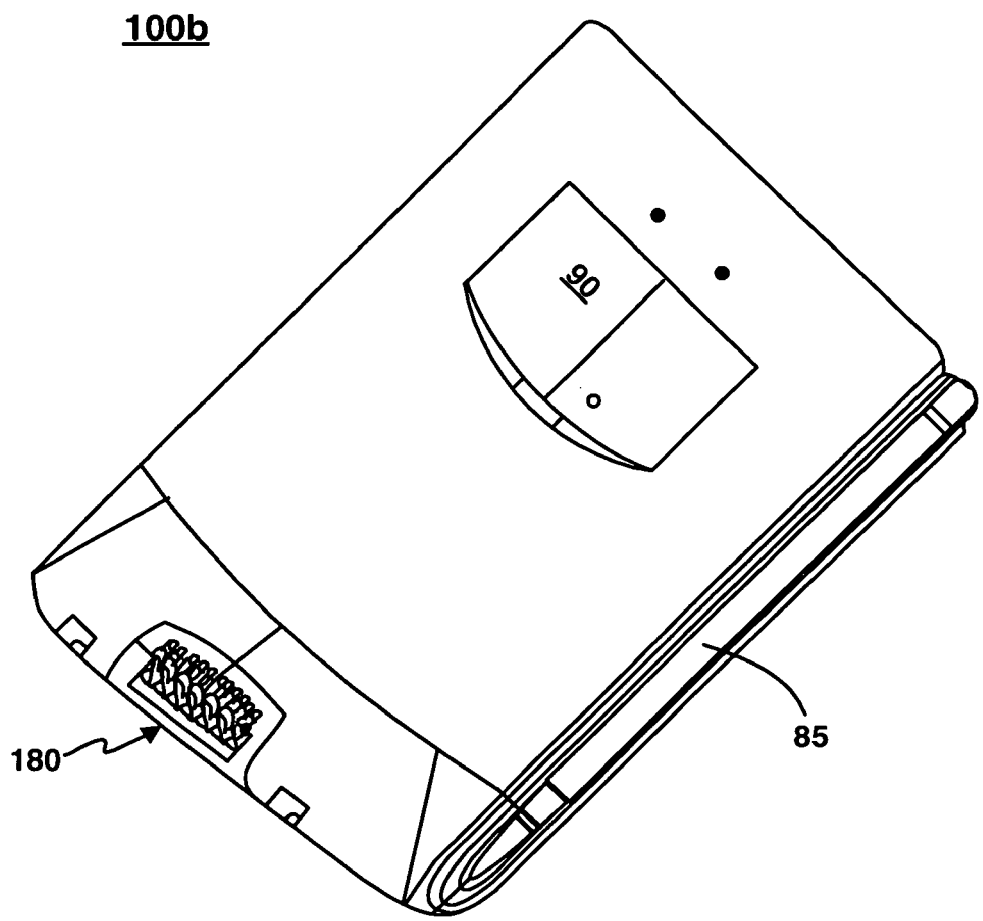
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
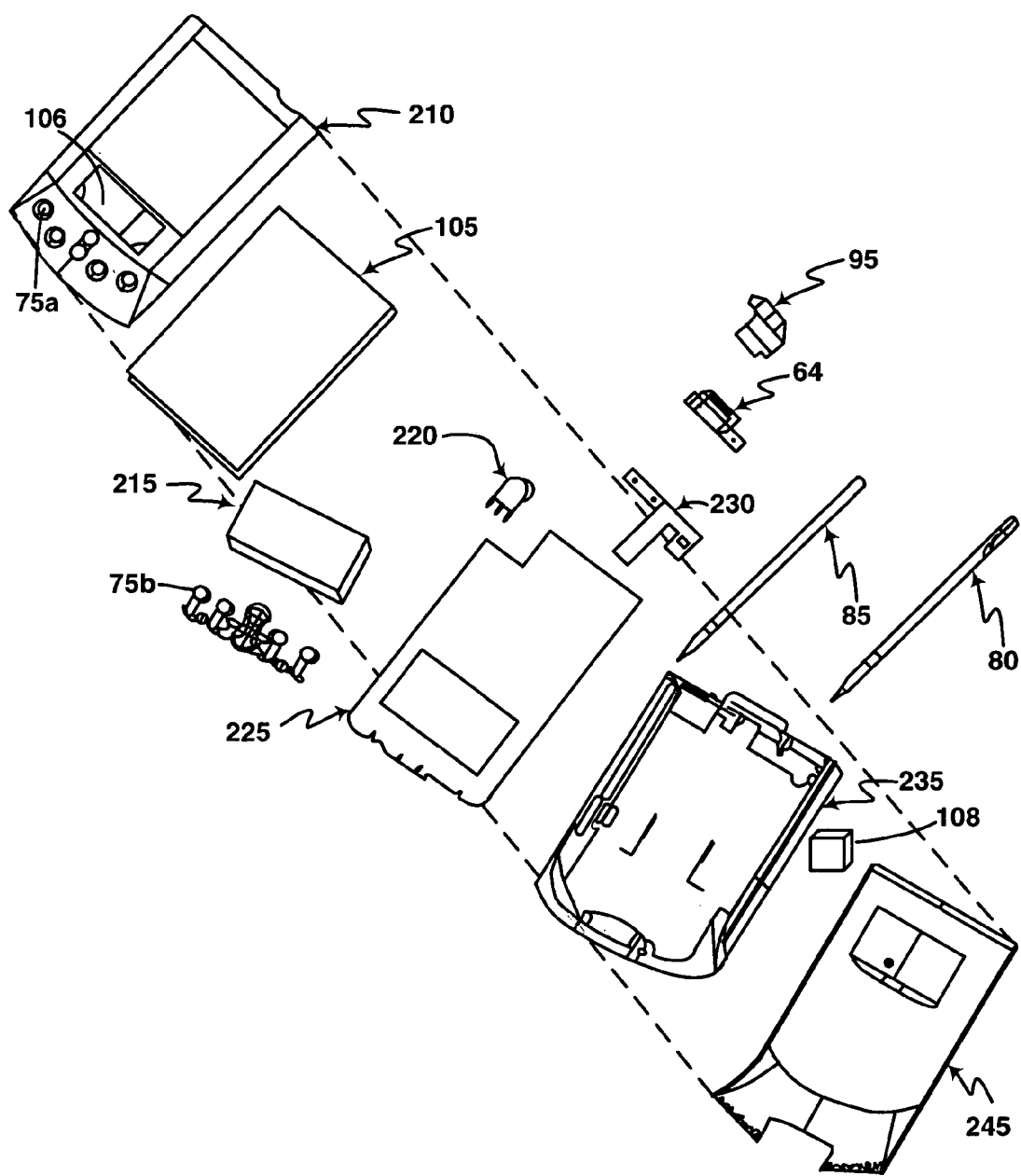
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
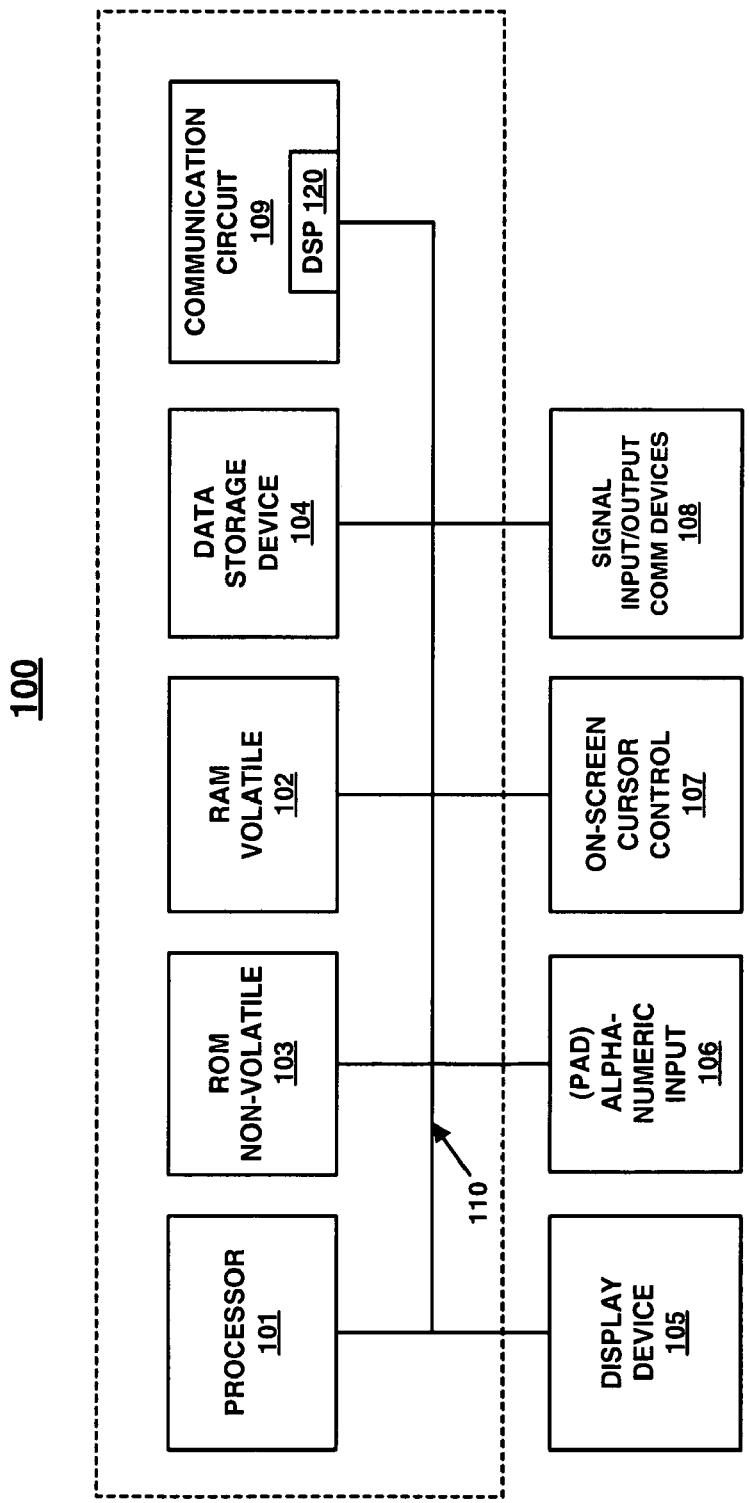
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
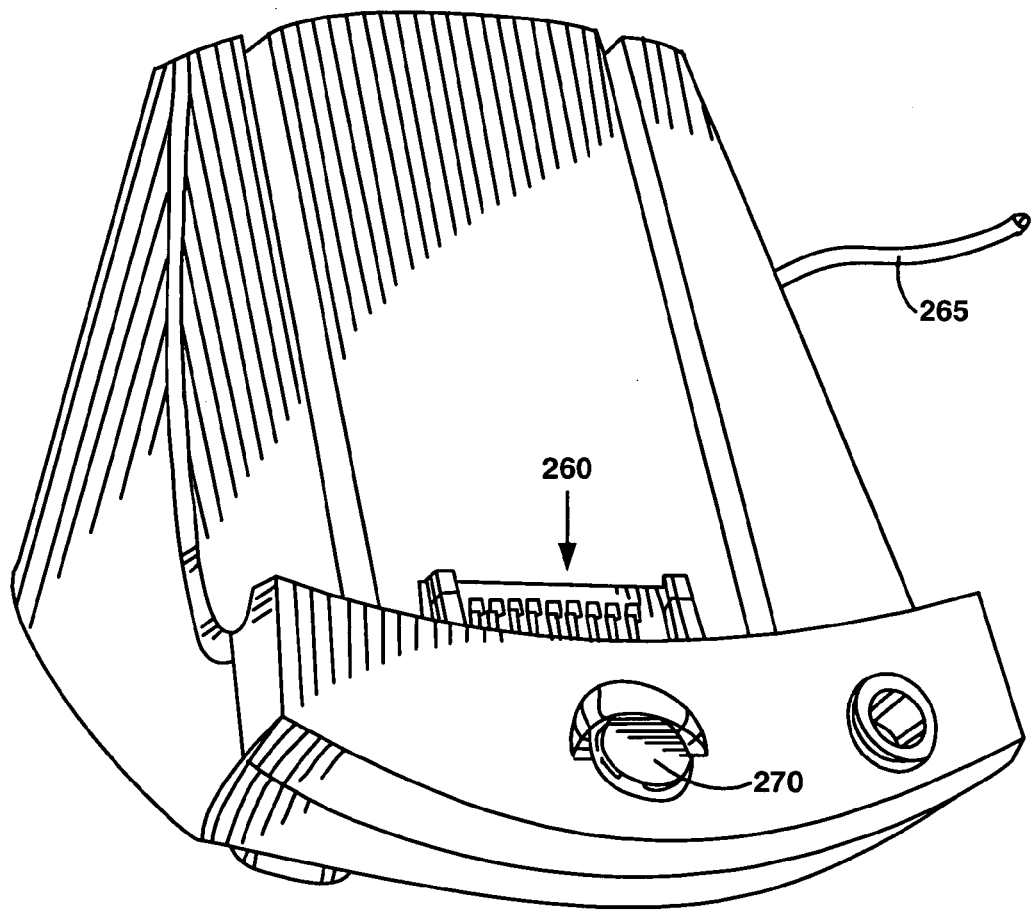
FIG. 6 is a perspective view of the cradle device for connecting the portable computer system to other systems via a communication interface in accordance with one embodiment of the present invention.

FIG. 6 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop Platform

Figure 7:
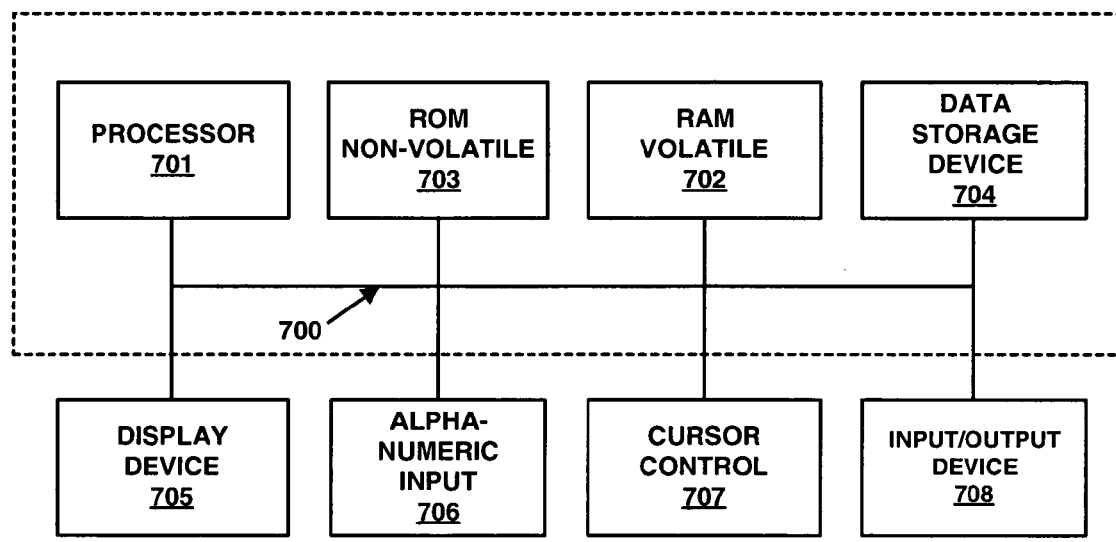
FIG. 7 is a block diagram of one embodiment of a desktop or laptop computer system in accordance with the present invention.

Refer now to FIG. 7 which illustrates an exemplary host computer system 342 (e.g., desktop computer system 56 or laptop computer system 58 of FIG. 1B) upon which embodiments of the present invention may be practiced. In one embodiment, host computer system 342 may instead be a server computer system in a computer system network (including the World Wide Web) or a proxy server computer (e.g., proxy server 36 of FIG. 1B).

Continuing with reference to FIG. 7, in general, computer system 342 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 100 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 7, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 8:
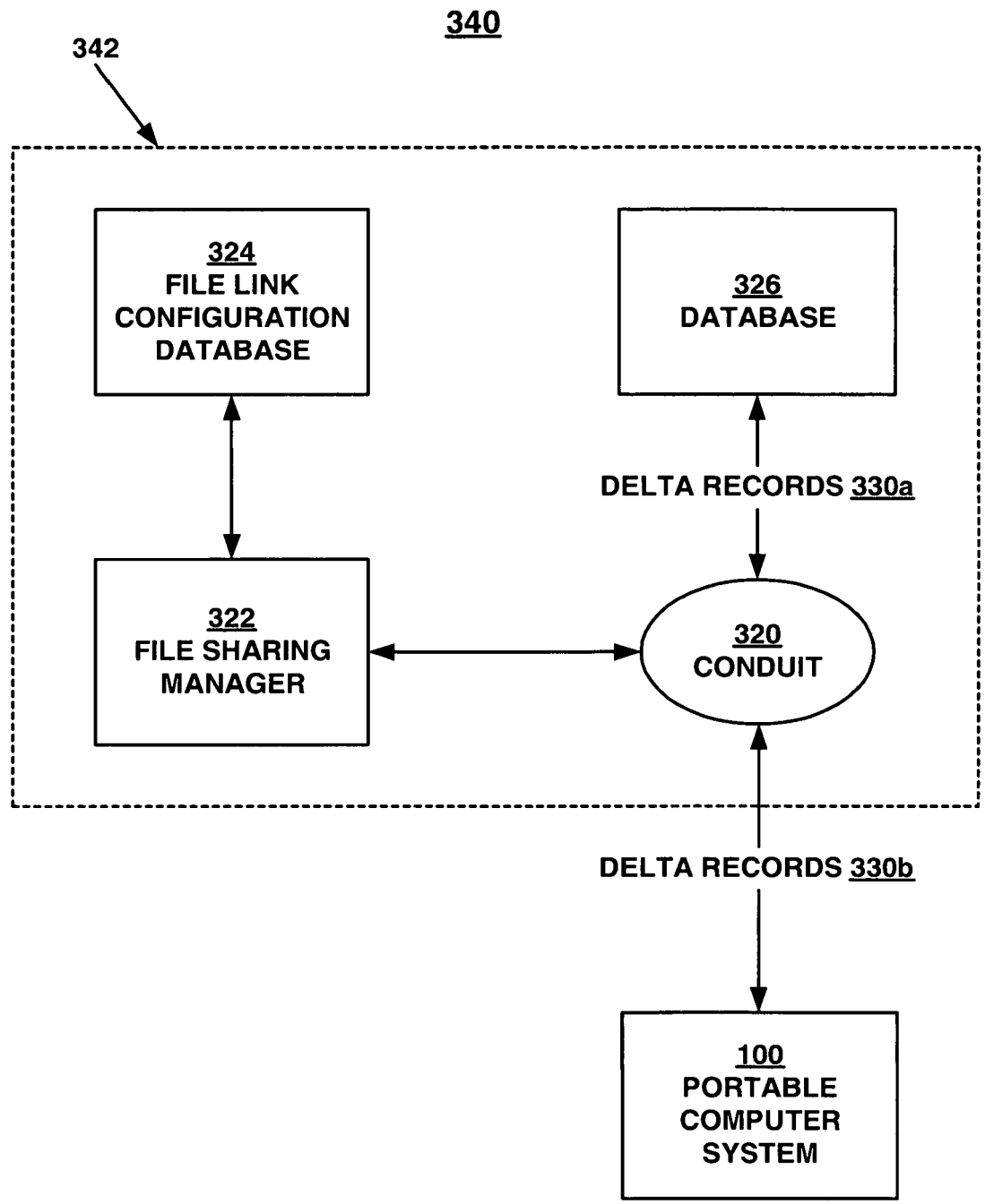
FIG. 8 is a block diagram of one embodiment of a system for allowing a portable computer system and another computer system to communicate in accordance with the present invention.

FIG. 8 illustrates a system 340 (also referred to as an "installer") in accordance with one embodiment of the present invention for allowing a portable computer system 100 (e.g., a palmtop or any portable computer system) to share information with a host computer system 342 (FIG. 7). Computer system 342 contains database 326, a software file sharing manager 322 (e.g., a hot-sync software manager), a file link configuration database 324, and a software conduit 320. The file link configuration database 324 is linked to the file sharing manager 322 and specifies, for a particular database, its source file, category information, and the frequency of update for the database. Conduit 320 outlines the manner in which records are to be synchronized between databases under control of file sharing manager 322. This process, including the file sharing manager and the conduit, is described in U.S. Pat. No. 5,884,323 by Hawkins et al., issued Mar. 16, 1999, assigned to the assignee of the present invention and hereby incorporated by reference.

With reference still to FIG. 8, portions of the present method and system for efficiently providing desired information to a mobile device are comprised of computer-readable and computer-executable instructions which reside, for example, in computer-usable media of for example, proxy server computer 36 of FIG. 1A, personal computer 56 and/or laptop computer 58 of FIG. 1B, or portable computer system 100 of FIGS. 1–5. It should be appreciated, however, that the present invention can operate within a number of different computer systems including general purpose networked computer systems, embedded computer systems, and stand alone computer systems. The computer readable media includes such items as, for example, a floppy disk, a compact disc, and the like which are coupled thereto or integral with the aforementioned computer systems.

With reference still to FIG. 8, portable computer system 100 is interfaced with computer system 342 using cradle 60 (FIG. 1B). Alternatively, portable computer system 100 can be interfaced with computer system 342 using a wireless (e.g., radio) connection. During synchronization between portable computer system 100 and database 326, delta records 330a and 330b are passed through conduit 320 between database 326 and a database of portable computer system 100 under control of the file sharing manager 322. Delta records 330a and 330b represent changes (including additions) that occurred on either portable computer system 100 or on computer system 342. After synchronization, these two databases will contain the same information. Namely, records updated on portable computer system 100 are reflected in database 326 and vice versa. The synchronization process (including the file sharing manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference, and also in U.S. Pat. No. 5,832,489 by Kucala, issued Nov. 3, 1998, assigned to the assignee of the present invention and hereby incorporated by reference.

DETAILED DESCRIPTION OF THE PRESENT EMBODIMENTS

Figure 9:
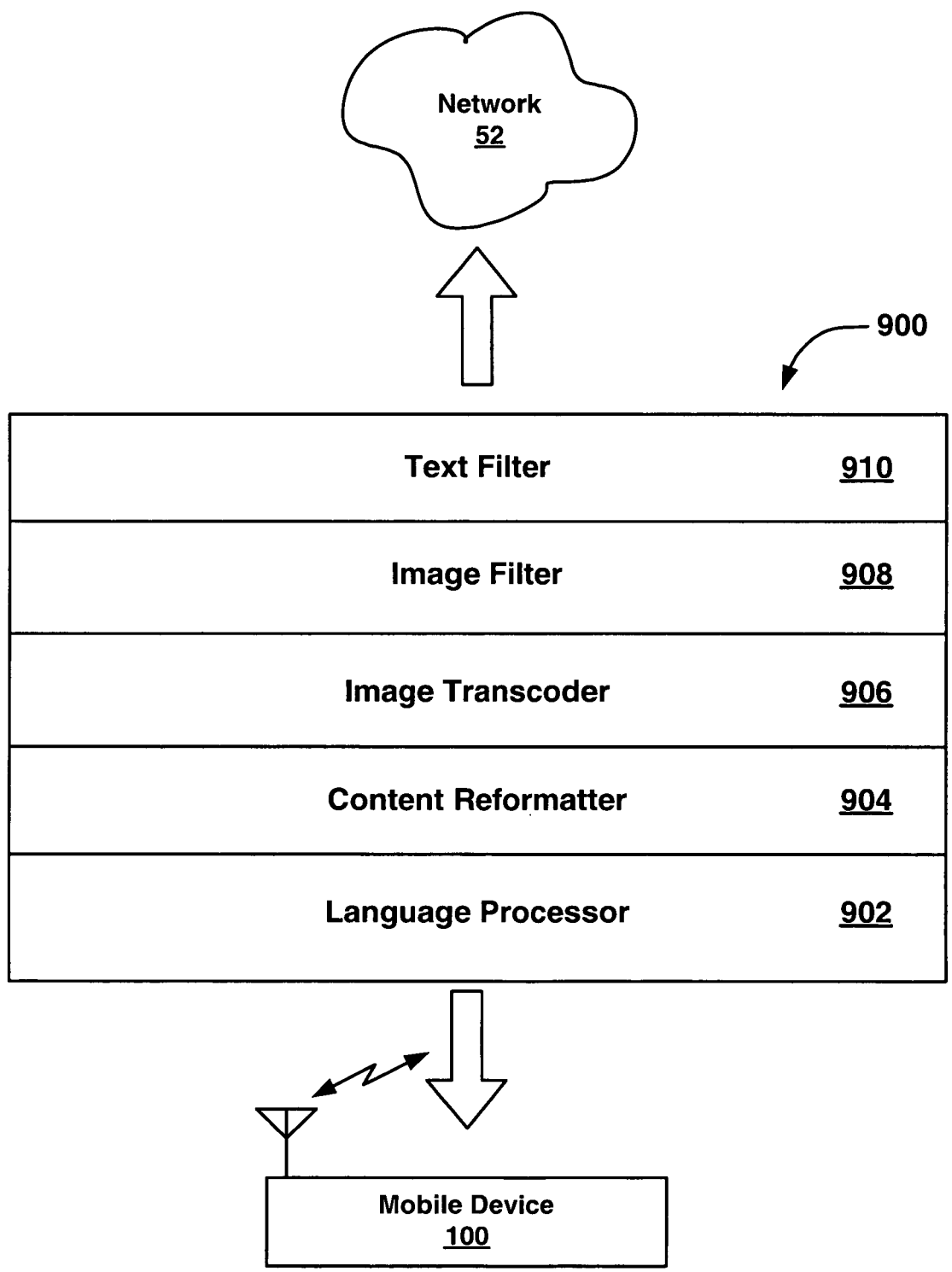
FIG. 9 is a schematic representation of one embodiment of a server architecture for dynamically managing content to be provided to a user of a mobile device in accordance with the present invention.

With reference now to FIG. 9, a schematic representation of a server 900 which achieves a method and system for dynamically managing content to be provided to a mobile device 100 (as shown in FIGS. 1A–5 as well) in accordance with one embodiment of the present invention is shown. The following discussion will begin with a description of the architecture of the present embodiments. This discussion will then be followed by a detailed description of the operation of the various embodiments of the present invention. Referring again to FIG. 9, server 900 includes several logical entities which can be implemented on an independent personal server running on a personal computer (PC) such as, for example, computer 56 of FIG. 1B. The present embodiment is also well suited to having components 902–910 reside at a Proxy Server (e.g. Proxy Server Computer 36 of FIG. 1A) or to residing on a standard public web server. The present invention is also well suited to having at least a portion of components 902–910 residing on, for example, computer-usable media of mobile device 100. As will be described in detail below, the precise location at which components 902–910 are stored or the precise type of computer-usable media on which components 902–910 reside is not as important as the functionality and advantages provided thereby. Specifically, components 902–910 of the present embodiment enable dynamic management of the content provided to a mobile device even if the content has not previously been tailored to accommodate access by a mobile device.

Referring still to FIG. 9, server 900 includes a language processor 902, a content reformatter 904, an image transcoder 906, an image filter 908, and a text filter 910. As shown in FIG. 9, mobile device 100 is able to wirelessly communicate with server 900. Although not shown in FIG. 9 for purposes of clarity, numerous other elements/features (e.g. cellular sites, a base station, a telephone network, and the like) may be present between server 900 and mobile device 100. Similarly, numerous other elements/features (e.g. a standard web server, communication systems, and the like) may be present between server 900 and network 52.

As will be described below in detail, server 900 is adapted to facilitate the obtaining of the desired information from a network such as, for example, Internet 52 of FIGS. 1A and 1B. Additionally, server 900 is also well suited to being incorporated into or operating in conjunction with other systems such as, for example, Saraide or WAP (wireless access protocol).

DETAILED DESCRIPTION OF THE OPERATION OF THE PRESENT INVENTION

Figure 10:
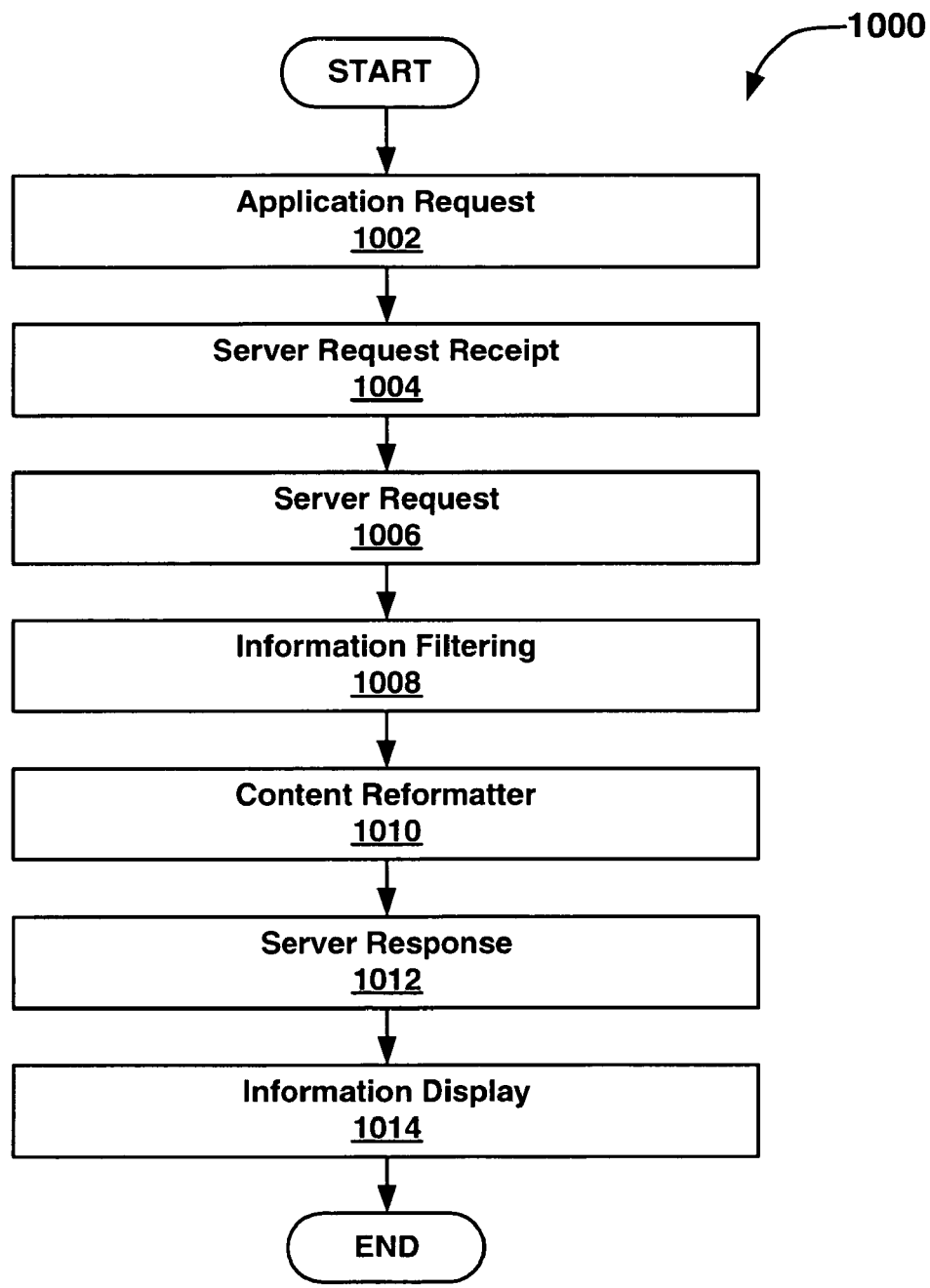
FIG. 10 is a flow chart of steps performed by one embodiment of a system and method for dynamically managing content to be provided to a user of a mobile device in accordance with the present invention.

With reference next to FIG. 10, a flow chart of exemplary steps performed in accordance with one embodiment of the present invention is shown. Flow chart 1000 includes processes of the present invention which, in one embodiment, are carried out by a processor under the control of computer-readable and computer-executable instructions. As mentioned above, the computer-readable and computer-executable instructions are stored, for example, in data storage features such as computer usable volatile memory 702 and/or computer usable non-volatile memory 703 of FIG. 7. As stated above, the computer usable memory physically resides, for example, in proxy server computer 36 of FIG. 1A, personal computer 56 and/or laptop computer 58 of FIG. 1B, or portable computer system 100 of FIGS. 1–5. The computer-readable and computer-executable instructions are used to control or operate in conjunction with, for example, processor 701 of FIG. 7. However, the computer-executable instructions, the computer-usable memory, and the processor are well suited to being located in any of various device and locations shown in the present Figures. Although specific steps are disclosed in flow chart 1000 of FIG. 10, such steps are exemplary. That is, the present invention is well suited to performing various other steps or variations of the steps recited in FIG. 10.

Furthermore, for purposes of explanation, many of the details of the present invention may be described in conjunction with an embodiment dealing with an ECommerce application. The present invention is not, however, limited to use with ECommerce applications. More specifically, the present invention is well suited to use with any application and/or protocol in which there is a need to dynamically manage content to be provided to a user of a mobile device.

At step 1002, a mobile device (e.g. mobile device 100 of FIGS. 1A–4) issues a request, from an application invoked on the mobile device, to server 900 to access information on the network. In one embodiment, the mobile device is a palmtop computer which utilizes an ECommerce application and which seeks to access an ECommerce web-site on the Internet. As mentioned above, however, many of the details of the present invention may be described in conjunction with an embodiment dealing with an ECommerce application. The present invention is not, however, limited to use with ECommerce applications. More specifically, the present invention is well suited to use with any application and/or protocol in which there is a need to efficiently provide desired information to a user of a mobile device.

Referring still to FIG. 10, in the present embodiment, the request from the mobile device to server 900, can occur using, for example, a wireless carrier network invoking a cellular digital packet data (CDPD) protocol, a code division multiple access (CDMA) protocol, a global service for mobile (GSM) protocol, a time division multiple access (TDMA) protocol, or any of various other wireless transmission systems.

At step 1004, server 900 receives the request for information and recognizes that the requested information is related to an ECommerce application. Mechanisms to achieve application identification include the use of an application flag in the packet, or examination of the uniform resource locator (URL) to determine whether the requested information resides at an ECommerce site. When employing the method of the latter approach, URLs pertaining to ECommerce sites are listed at server 900 or the list of such URLs is accessible by server 900. Similarly, the present invention would also recognize various other application types and/or sites which may be utilized by a user of the mobile device.

Next, at step 1006, server 900 which initially received the request for information from the mobile device, delivers the request to, for example, a standard web server for handling. That is, server 900 requests that a standard web server retrieve, from network 56, the information requested by the mobile device. In one embodiment, server 900 is the server which initially receives the request from the mobile device. The present invention is, however, also well suited to an embodiment in which server 900 is not the server which initially receives the request from the mobile device. In such an embodiment, the server which initially receives the request for information from the mobile device must know the address of server 900, and then forward the request to that server.

With reference now to step 1008, after the standard web server has retrieved the requested information and forwarded the requested information to server 900, an information filtering process is performed. For purposes of the present application, the end result of the information filtered by server 900 will be referred to as the "desired information." This desired information differs from the type of information conventionally returned to a user of a mobile device. More specifically, information retrieved by conventional web-browsing systems without the benefit of the present invention often contains unwanted content, superfluous data, and/or information which is unrelated to the requested information. To the contrary, in the present embodiment, server 900 determines which specific information to retain (the desired information which will be subsequently forwarded to the mobile device) and which information to discard.

With reference still to step 1008, server 900 of the present embodiment retains only the information which most appropriately corresponds to the request by the user of the mobile device. That is, server 900 discards or ignores content that is in some way irrelevant to or superfluous for the transaction. In one embodiment, server 900 employs language processor 902 to determine which content/information is relevant to the user's request and which content/information is desired, by examining the encoded content. In the following example, the content is encoded in extensible markup language (XML). Although XML is specifically mentioned herein, the present invention is well suited to the use of several other techniques that could be used to encode or represent content.

Figure 11:
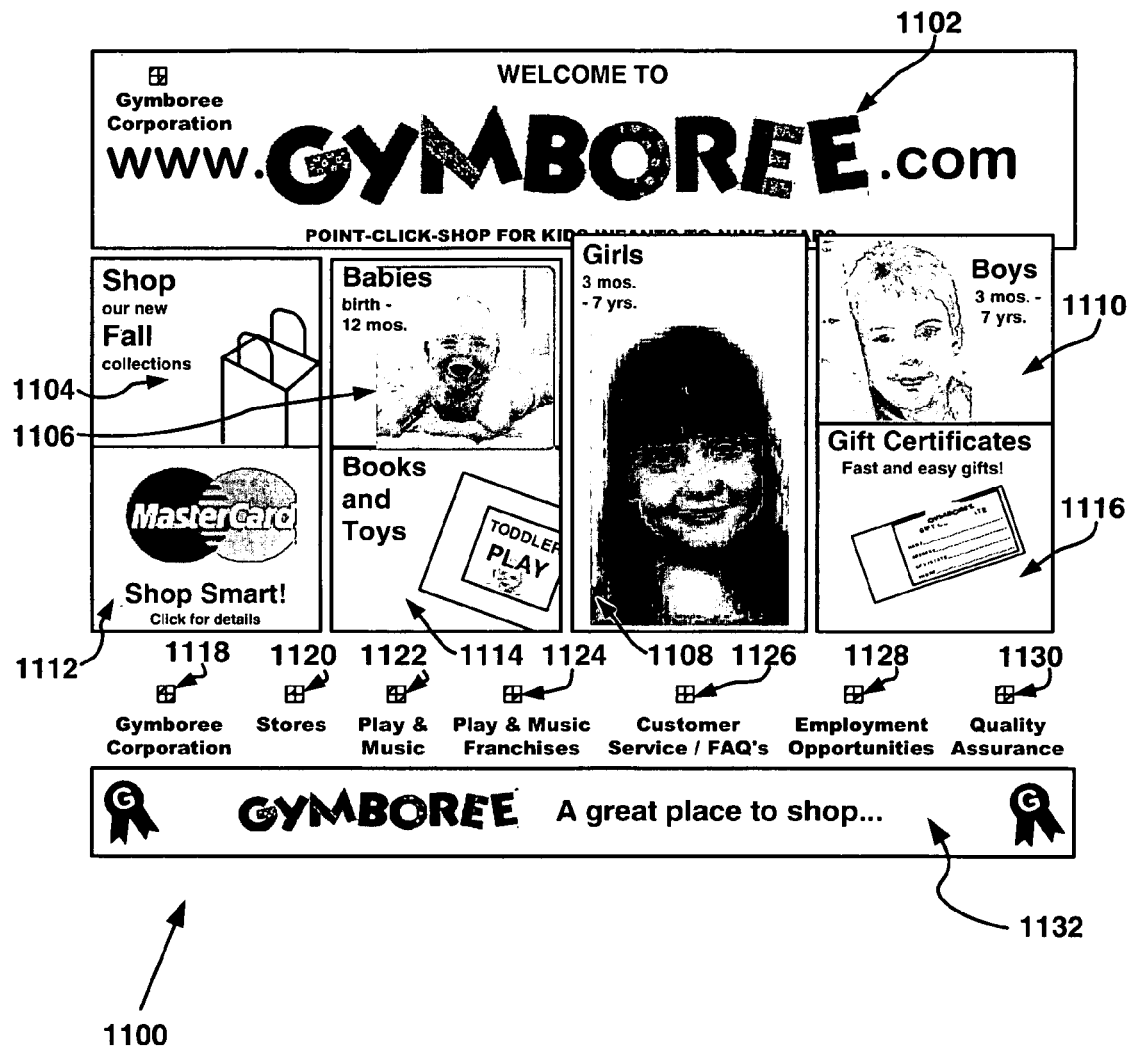
FIG. 11 is a diagram of an ECommerce-related web site whose content can be dynamically managed by the server of FIG. 9 in accordance with the present invention.

With reference to FIG. 11, a diagram of a typical ECommerce-related web site 1100 is shown. Using web site 1100 as an example, standard web content can be encoded via XML. For purposes of clarity and explanation, the features of web site 1100 have reference numerals assigned thereto (i.e. reference numerals 1102–1132). Reference numerals 1102–1132 are also listed below next to the XML code portions representing each feature.

```
<ECommerce home page>
    <large vendor logo image> GIFFile#1 </large vendor logo image> (1102)
        <EcommerceButton Text> Shop </EcommerceButtonText>
            <ECommerce button image> GIFFile#2 </ECommerce button image> (1104)
        <EcommerceButton Text> Babies </EcommerceButtonText>
            <ECommerce button image> GIFFile#3 </ECommerce button image> (1106)
        <EcommerceButton Text> Girls </EcommerceButtonText>
            <ECommerce button image> GIFFile#4 </ECommerce button image> (1108)
        <EcommerceButton Text> Boys </EcommerceButtonText>
            <ECommerce button image> GIFFile#5 </ECommerce button image> (1110)
        <EcommerceButton Text> Mastercard </EcommerceButtonText>
            <ECommerce button image> GIFFile#6 </ECommerce button image> (1112)
        <EcommerceButton Text> Books and Toys </EcommerceButtonText>
            <ECommerce button image> GIFFile#7 </ECommerce button image> (1114)
        <EcommerceButton Text> Gift Certificates </EcommerceButtonText>
            <ECommerce button image> GIFFile#8 </ECommerce button image> (1116)
        <CompanyInfo> Gymboree Corporation </CompanyInfo> (1118)
        <CompanyInfo> Stores </CompanyInfo> (1120)
        <CompanyInfo> Play & Music </CompanyInfo> (1122)
        <CompanyInfo> Play & Music Franchises </CompanyInfo> (1124)
        <FAQs> Customer Service/FAQs </FAQs> (1126)
        <Jobs> Employment Opportunities </Jobs> (1128)
        <Guarantee> Quality Assurance </Guarantee> (1130)
    <small vendor logo image> GIFFFile#9 </small vendor logo image> (1132)
</ECommerce home page>
```

Assuming such encoding, in the present embodiment, server 900 will filter out content contained in the following tags: <large vendor logo image>, <ECommerce Button image>, <Company Info>, <Jobs>. As a result, server 900 discards or ignores content that is in some way irrelevant to or superfluous for the transaction. Thus, only that content which is necessary to conduct an ECommerce transaction is retained. Therefore, the resultant "desired information" is not cluttered with unnecessary content related to, for example, employment opportunities, franchises, corporate information, and the like. It is important to note, that the present invention, unlike conventional web clipping approaches does not arbitrarily clip/remove all images. Instead, the present invention is adapted to selectively retain images (and text corresponding thereto) which are necessary or which are deemed beneficial to a particular application. Furthermore, the present embodiment enables such dynamic management of the content even if the content has not previously been tailored to accommodate access by a mobile device.

Referring again to step 1008, as an overview, in the present embodiment, server 900 determines the type of application (e.g. ECommerce) to which the requested information pertains. Mechanisms to achieve application identification include, for example, checking to see if an application/content flag exists. In such a case, the text is scanned to match it against a predefined set of application-specific tags. For example, the content is examined by the server to determine whether the content received at step 1008 is tagged with a markup language (e.g. XML), such as "ECommerce tags". If such tags are found in the text, the page is presumed to hold ECommerce content. Both mandatory as well as optional tags can be identified in the predefined ECommerce tag set. If the mandatory tags for different applications do not overlap, the appearance of the mandatory tags is sufficient to indicate an ECommerce application. If there is tag overlap, further checking for optional tags is performed by the server. For an ECommerce, a sampling of mandatory tags could include <item> and <price>. These tags are then used to selectively retain or discard information.

Referring still to step 1008, if a hierarchical tagging mechanism exists, server 900 is adapted to strip the content in a scalable manner to support multiple devices with different form factors. An example of hierarchical tags is as follows:

```
<product>
    <product id> 1 </productID>
    <name>Building operating systems</name>
    <description>
        <text> This book describes how to build operating systems for i386
            architecture</text>
        <image> encoding="gif"
            compression="zip">ASDI@#(:$ASDMFAMS@(#</image>
    </description>
    <price>25$ US</price>
    <availability>Book usually ships in 48 hours</availability>
</product>
```

In this example, product is the key tag and name, description, price, and availability are sub-tags. Within the description tag are tags for text and image. For a minimal screen device, the data in the image tag can be stripped.

Referring still to step 1008, in addition to irrelevant content, there can also be non-essential information not suited for display on a small screen. For example, a search on a model name can result in the return of multiple entries. It is reasonable to trade the amount of information displayed for a better user experience. Based on this observation, the server 900 can choose to display the first few entries (the actual number is based on user specified preference). Other similar approaches include displaying only the first few lines of a detailed product description. If the user knows what to buy, he/she can move forward, otherwise the user can tap on a "more info" link to view the full content. In order to achieve this, the present invention relies on markup technologies such as XML that can tag the content so that the server 900 can dissect the components of a web page and determine whether or not to display those components. Although XML is specifically recited in one embodiment of the present invention, XML is used only as one example of a markup language. More importantly, original web content is semantically encoded in a standard language. This could be done manually or automatically.

Hence, server 900 saves bandwidth and delivers a more focused user experience. More specifically, in the present embodiment, the first "web page" a user is delivered will contain only information necessary to facilitate use of the site, not all information (unrelated advertisements, excess logos, superfluous banners, and the like) which are conventionally present at that site. In so doing, the present embodiment eliminates the user input-intensive and tedious browsing activities associated with reaching the desired content. Additionally, because only pertinent information will subsequently be wirelessly forwarded to the mobile device, the present embodiment reduces the costs associated with wirelessly accessing information or conducting, for example, ECommerce activities.

Referring still to step 1008 of FIG. 10, once the application type is identified, the server 900 processes the page using filtering/compression techniques. Filtering approaches, in the present embodiment, include, for example, text filtering using text filter 910 of FIG. 9 to selectively delete unnecessary text. Image filtering using image filter 908 to selectively delete unnecessary images is also employed in one embodiment of the present invention. As mentioned above, by default, conventional proxy servers generally strip images if they are forced to process image content. However, some ECommerce sites will have images that may aid in the purchase decision. In such cases, multiple images from a single ECommerce website page may need to be reformatted for effective screen display. However, simple prior art techniques will not suffice, as many ECommerce sites rely on images, "buy now" buttons, and shopping cart icons. In the present embodiment, server 900 performs image filtering only to remove redundant or unnecessary images. Examples of superfluous images might include banners and vendors logos. In the above example, a redundant image such as the company logo will be filtered by locating content encoded in the tag <large vendor logo image>. Although such specific filtering approaches are mentioned above, the present embodiment is also well suited to the use of various other filtering approaches as well.

Referring still to step 1008 of FIG. 10, in the present embodiment, image transcoding by image transcoder 906 is performed if the image is a key part of the ECommerce transaction. Image transcoding is needed to scale images to an appropriate viewing size and to transform images into appropriate resolution and color depth. In one embodiment, a standard image transcoding algorithm is used, such as those typically found in an hypertext transfer protocol (HTTP) transcoding proxy.

With reference now to step 1010 of FIG. 10, server 900 then reformats the desired information. More specifically, a module (e.g. content reformatter 904) uses as input a set of mobile device characteristics (e.g. screen height and width) and dynamically reformats the desired information based on these parameters. This reformatting typically involves line wrapping, scroll indicators, or other techniques dictated by the small screen size of the mobile device. In one ECommerce embodiment, content reformatter 904 either retrieves a predefined ECommerce template that matches the mobile device's characteristics or retrieves a "standard" Internet ECommerce site template and dynamically scales it down to fit the mobile device's characteristics. If the mobile device's characteristics are not available, content reformatter 904 scales the content to the minimum template size. Finally, via content identification techniques, such as, for example, XML tagging, appropriate content is located and used to fill the template with the proper values. In an embodiment in which the XML language is used, style sheets can be designed and pre-stored for different types and sizes of devices.

Next, at step 1012, server 900 then passes the processed desired information (e.g. web page) back to the mobile device. As mentioned above, in one embodiment this transmission from server 900 to the mobile device takes place via a wireless communication system invoking a cellular digital packet data (CDPD) protocol, a code division multiple access (CDMA) protocol, a global service for mobile (GSM) protocol, a time division multiple access (TDMA) protocol, or any of various other wireless transmission schemes.

Next, at step 1014, after receiving the desired information transmitted at step 1012, the mobile device displays the preprocessed content (e.g. a web page(s)) on its screen.

It will be seen that several substantial advantages are realized by the present invention. Among these advantages are ease of use, lower cost, and improved response time for mobile device operators.

Thus, present invention provides a method and system which dynamically manages the content provided to a mobile device. The present invention further provides a method and system which achieves the above accomplishment and which dynamically manages the content provided to a mobile device even if the content has not previously been tailored to accommodate access by a mobile device. The present invention also provides a method and system which achieves the above accomplishment and which inexpensively, and quickly provides a mobile device user with desired information without supplying superfluous and/or unwanted information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A method for dynamically managing content provided to a mobile device, said method comprising the steps of:
   a) retrieving information from a network wherein said network comprises the Internet and wherein said information is associated with a commerce transaction;
   b) dynamically assessing said information by matching said information against a predefined set of transaction-specific tags to determine a type of transaction to which said information pertains;
   c) selectively filtering said information based only on said information such that desired information is compiled and only transaction specific information is retained; and
   d) forwarding said desired information through said network to said mobile device that is remotely located.

2. The method of claim 1 for dynamically managing content provided to a mobile device wherein step a) comprises retrieving information from said network wherein said information has not previously been tailored for interaction with a mobile device.

3. The method of claim 1 for dynamically managing content provided to a mobile device wherein step b) comprises determining an application to which said information corresponds.

4. The method of claim 1 for dynamically managing content provided to a mobile device wherein step b) comprises determining if said information contains a transaction-specific tag.

5. The method of claim 4 for dynamically managing content provided to a mobile device wherein step c) comprises selectively filtering said information such that said desired information is compiled by retaining only essential portions of said information which contains said transaction-specific tag.

6. The method of claim 1 for dynamically managing content provided to a mobile device wherein step c) comprises selectively filtering said information such that said desired information is compiled by subjecting said information to a text filter, an image filter, and an image transcoder.

7. The method of claim 1 for dynamically managing content provided to a mobile device wherein step d) further comprises, prior to forwarding said desired information to said mobile device, reformatting said desired information based upon characteristics of said mobile device.

8. A computer system comprising:
   a processor;
   an address/data bus coupled to said processor;
   a computer readable memory coupled to communicate with said processor, said processor for performing the dynamic content management steps of:
   a) retrieving information from a network wherein said network comprises the Internet and wherein said information is associated with a commerce transaction;
   b) dynamically assessing said information by matching said information against a predefined set of transaction-specific tags to determine a type of transaction to which said information pertains;
   c) selectively filtering said information based only on said filtering such that desired information is compiled and only transaction specific information is retained; and
   d) forwarding said desired information through said network to a mobile device that is remotely located.

9. The computer system as recited in claim 8 wherein step a) of said dynamic content management steps performed by said processor further comprises retrieving information from said network wherein said information has not previously been tailored for interaction with a mobile device.

10. The computer system as recited in claim 8 wherein step b) of said dynamic content management steps performed by said processor further comprises determining an application to which said information corresponds.

11. The computer system as recited in claim 8 wherein step b) of said dynamic content management steps performed by said processor further comprises determining if said information contains a transaction-specific tag.

12. The computer system as recited in claim 11 wherein step b) of said dynamic content management steps performed by said processor further comprises selectively filtering said information such that said desired information is compiled by retaining only essential portions of said information which contains said transaction-specific tag.

13. The computer system as recited in claim 8 wherein step c) of said dynamic content management steps performed by said processor further comprises selectively filtering said information such that said desired information is compiled by subjecting said information to a text filter, an image filter, and an image transcoder.

14. The computer system as recited in claim 8 wherein step d) of said dynamic content management steps performed by said processor further comprises, prior to forwarding said desired information to said mobile device, reformatting said desired information based upon characteristics of said mobile device.

15. A computer-usable medium having computer-readable program code embodied therein for causing a computer to perform the dynamic content management steps of:
   a) retrieving information from a network wherein said network comprises the Internet and wherein said information is associated with a commerce transaction;
   b) dynamically assessing said information by matching said information against a predefined set of transaction-specific tags to determine a type of transaction to which said information pertains;
   c) selectively filtering said information based only on said information such that desired information is compiled; and
   d) forwarding said desired information through said network to a mobile device that is remotely located.

16. The computer-usable medium as recited in claim 15, wherein said computer-usable medium further causes said computer performing step a) to retrieve said information from said network wherein said information has not previously been tailored for interaction with a mobile device.

17. The computer-usable medium as recited in claim 15, wherein said computer-usable medium further causes said computer performing step b) to determine the an application to which said information corresponds.

18. The computer-usable medium as recited in claim 15, wherein said computer-usable medium further causes said computer performing step b) to determine if said information contains a transaction-specific tag.

19. The computer-usable medium as recited in claim 18, wherein said computer-usable medium further causes said computer performing step b) to selectively filter said information such that said desired information is compiled by retaining only essential portions of said information which contains said transaction-specific tag.

20. The computer-usable medium as recited in claim 15, wherein said computer-usable medium further causes said computer performing step c) to selectively filter said information such that said desired information is compiled by subjecting said information to a text filter, an image filter, and an image transcoder.

21. The computer-usable medium as recited in claim 15, wherein said computer-usable medium further causes said computer performing step d) to reformat said desired information based upon characteristics of said mobile device prior to forwarding said desired information to said mobile device.

\* \* \* \* \*